(No Model.) 3 Sheets—Sheet 1.

C. H. VAN DEUSEN.
CASH REGISTER AND INDICATOR.

No. 561,741. Patented June 9, 1896.

Witnesses
A. S. Courtright
Lela Monroe

Inventor
Chas. H. Van Deusen
By Attorney V. H. Lockwood

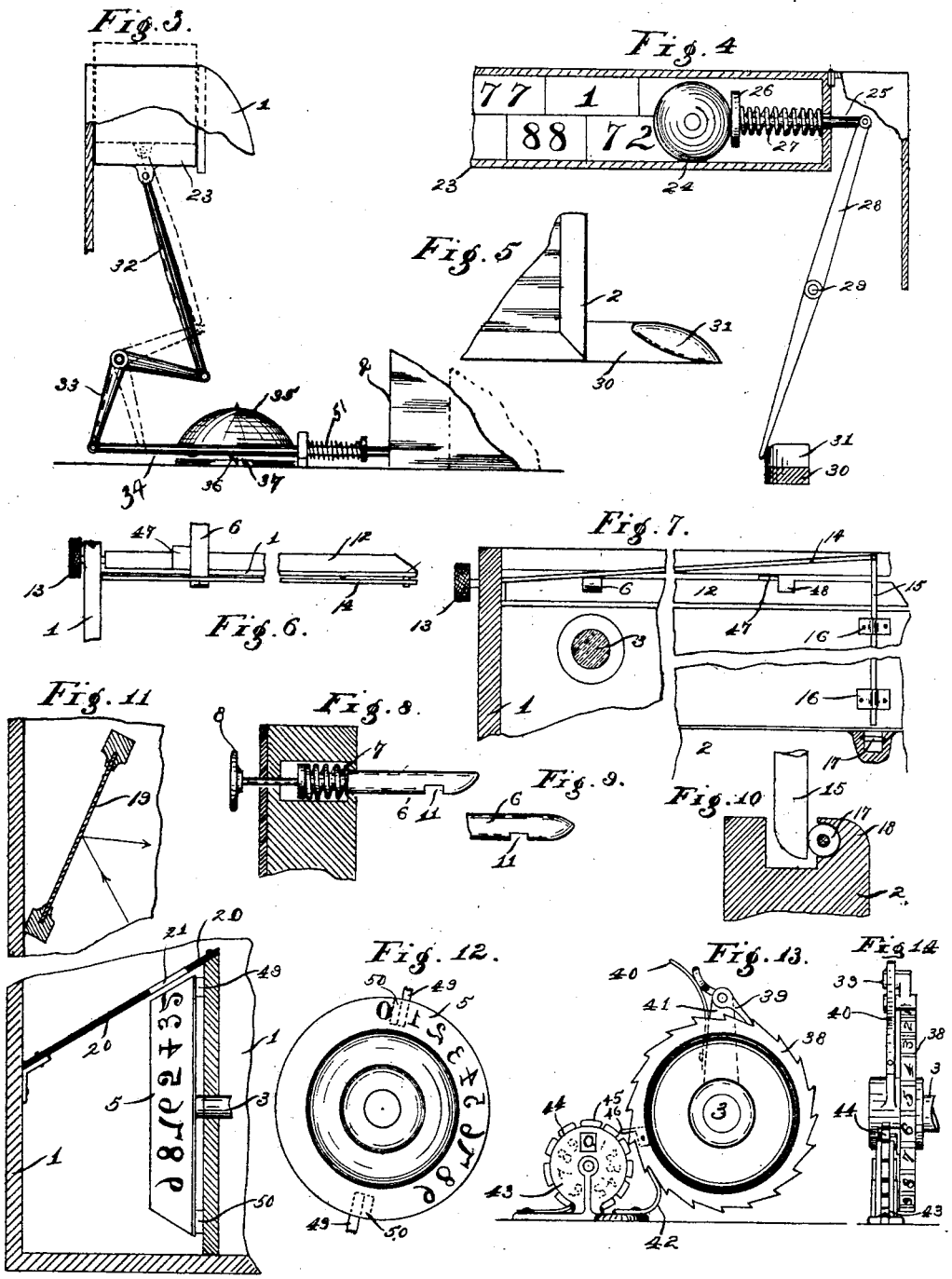

(No Model.) 3 Sheets—Sheet 3.
C. H. VAN DEUSEN.
CASH REGISTER AND INDICATOR.
No. 561,741. Patented June 9, 1896.
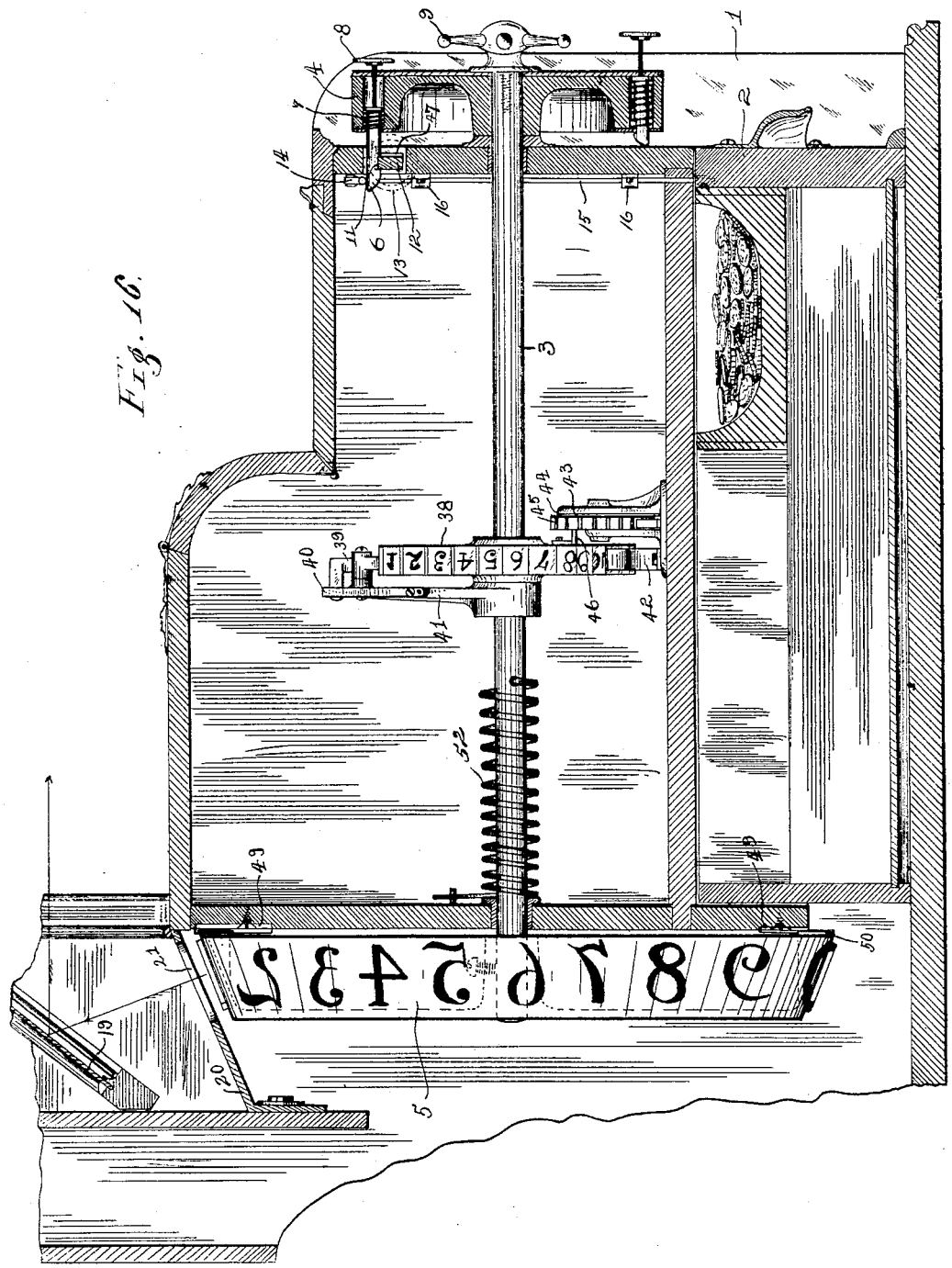
Witnesses
A. J. Courtright
L. A. Monroe
Inventor
Charles H. Van Deusen
By Attorney V. H. Lockwood

UNITED STATES PATENT OFFICE.

CHARLES H. VAN DEUSEN, OF CHICAGO, ILLINOIS.

CASH REGISTER AND INDICATOR.

SPECIFICATION forming part of Letters Patent No. 561,741, dated June 9, 1896.

Application filed November 5, 1894. Serial No. 527,940. (No model.)

*To all whom it may concern:*

Be it known that I, CHARLES H. VAN DEUSEN, of Chicago, county of Cook, and State of Illinois, have invented certain new and useful Improvements in Cash Registers and Indicators; and I do hereby declare that the following is a full, clear, and exact description thereof, reference being had to the accompanying drawings, in which like figures refer to like parts.

My invention relates to a cash register and indicator which is simpler, cheaper, and more satisfactory, it is believed, than cash-register machines heretofore made.

One feature of my machine is that devices carrying indicating-numerals are worked directly by the operator, and such numerals are reflected by a mirror in any desired direction for the customer to view. Thus I am enabled to make a very simple device of few parts that can scarcely get out of order. I am also enabled to mount counters on the shafts that operate the indicating-wheels which are very simple and yet enable the operator after a day's business to determine the total of his sales very quickly. The construction of my machine is such also that no mistake of any kind can be made in the registration, provided the operator operates the key for the proper amount. In such case the amount indicated cannot be greater or less than the amount marked on the key.

Another important feature of my machine consists in combining with it a chance device whereby the customers will always be led to examine the amount of their purchases indicated by the indicating mechanism. Practically the sole prevention of fraud that is intended to be accomplished by cash registers and indicators is the examination by the customer of the amount indicated. The proprietor is not present to see that the employee registers the proper amount. Hence he must rely upon the customer seeing that the proper amount is registed. I consider this feature a very valuable one, because it makes the device useful to a merchant and is a preventive of fraud. I do not claim to be the inventor of this idea, but only of the means herein shown. The various features of my machine will appear from the drawings and the description following.

Figure 1:
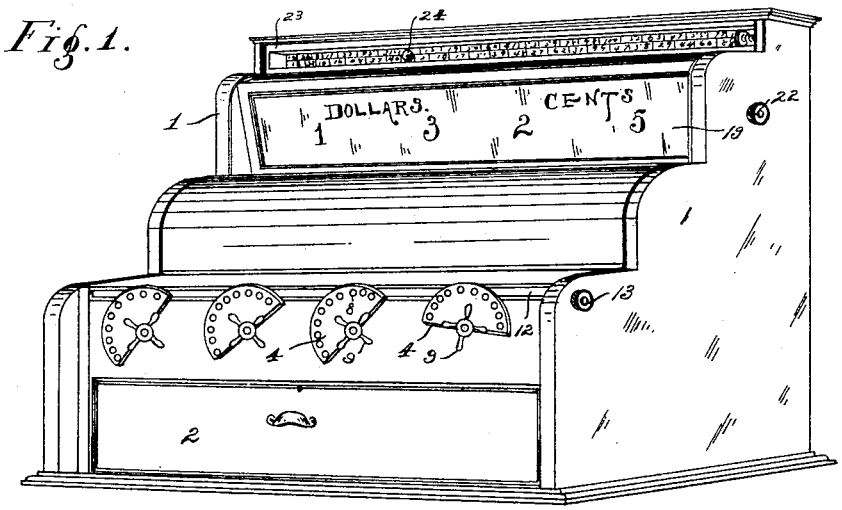
Figure 2:
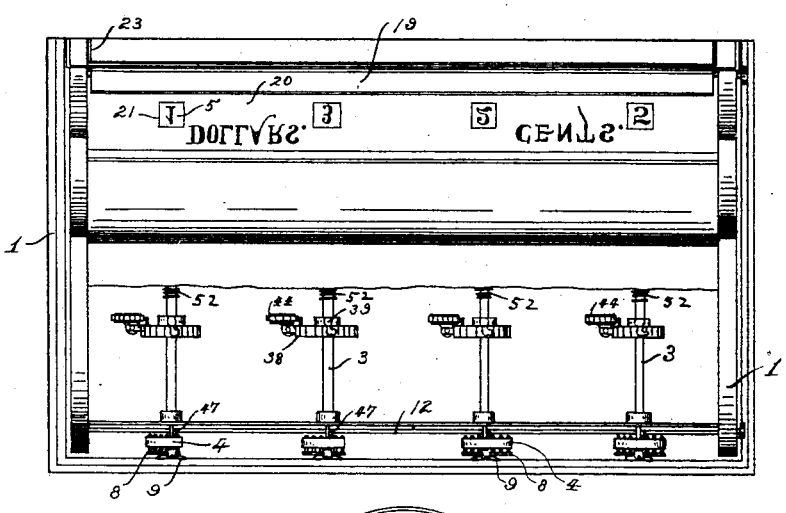
Figure 15:
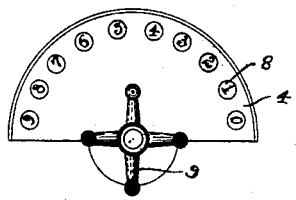

Figure 1 is a front elevation of my machine. Fig. 2 is a plan view thereof with the lid or a portion of the top removed. Fig. 3 is a detail view of the means of ringing the bell and tilting the chance device or marble-chute. Fig. 4 is a detail view of the marble in the chance device and the means of actuating it. Fig. 5 is a plan view of the finger on the rear of the drawer that actuates the marble in the chance device. Fig. 6 is a plan view of the front right-hand corner, Fig. 2, showing the resetting device and the drawer-releasing device and means of operating it. Fig. 7 shows the drawer-releasing device, the parts being broken away. Fig. 8 is a cross-section of a part of the dial-plate with a key mounted therein. Fig. 9 is a side view of the inner end of the key to actuate the drawer-releasing device. Fig. 10 is a detail view of the connection between the front of the drawer and the rod which holds it in place. Fig. 11 is a cross-section of the rear portion of my machine, part being broken away, showing the relative position of the indicating-wheel and the mirror. Fig. 12 is a rear elevation of an indicating-wheel. Fig. 13 is a side elevation of an adding-wheel. Fig. 14 is an end view thereof. Fig. 15 is an elevation of a key-disk; and Fig. 16 is a longitudinal vertical section of my machine, a portion of the rear and top being broken away.

I provide a suitable casing 1, that is nickle-plated or otherwise made so as to present an attractive appearance, having in the lower part thereof a cash-drawer 2, made in the usual form. Extending from front to rear are shafts 3, on the front end of which outside the casing are secured the key-supporting disks 4, and on the rear end the indicating-wheels 5. Extending through the disks are keys 6, mounted, as shown in Fig. 8, with a spiral spring 7, inclosed within a chamber in the key-supporting disk 4. On the outer end of the key there is mounted a button 8, with a numeral thereon. In each disk there is a series of nine keys, being numbered from "1" to "9" from right to left. Connected to these disks are star-wheels 9, with rims or handles thereon, or any other means whereby one can readily rotate the shaft with the hand, while at the same time the thumb is free to actuate the keys in the disk. I show four disks, the first one to the right being cents, the second dimes, the third dollars, and the fourth tens of dollars. The number of these may be altered as desired. On my cents-disk I have a zero-key 10, which I use to open the cash-drawer, when the cents-disk does not have to be actuated to register the amount. When such disk has to be actuated to register the amount, any of the other keys on the disk will open the drawer, as will hereinafter be explained. The keys on the other disks are not so arranged that they can open the drawer. The object of this is to require the amount to be registered before the drawer is opened, as the registration would naturally proceed from the left to the right, beginning with dollars and ending with cents. If thirteen dollars and twenty cents were desired to be registered, the first three keys would be operated as shown in Fig. 1; but the drawer would not open until the zero-key 10 in the cents-disk was operated. If, however, thirteen dollars and twenty-five cents were to be registered, the operation of the five-cent key would open the drawer without the necessity of operating the zero-key 10.

The inner end of the keys when operated extend through an opening in the front part of the casing wide enough to permit some vertical play of the keys. The keys are provided with a notch 11 on their under side adapted to engage a rocking plate 12, that is mounted at each end in the sides of the casing near the front end and extends from one side to the other in the opening in the casing above mentioned. There is a notch 48 in the rocking plate to receive the key and a lug 47 to prevent the key passing the notch. On the right-hand end of this rocking plate I provide a button 13 or other means of rocking the plate. The purpose of this rocking plate 12 is to hold the keys in position after they have been operated from the time one amount is registered until the next amount is to be registered. When the next amount is to be registered, the button 13 is turned to the front slightly, causing the upper edge of the rocking plate 12 to turn to the front, thus releasing all the keys and resetting the machine. The inner end of the keys is beveled on the under side in order that it may readily pass over the upper edge of the rocking plate 12.

The drawer holding and releasing device consists of a rod 14, running from the right-hand corner of the casing, near the button 13, toward the center of the machine and preferably to the center and having a downwardly-extending rod 15, joined with the rod 14 by an elbow-joint and passing through guides 16 on the inside of the casing and engaging a friction roller or catch 17 in the drawer. The lower end of the rod 15 and the upper inner edge 18 of the cash-drawer are beveled, as shown in Fig. 10, so that when the drawer is pushed in the rod 15 will ride over the upper inner edge 18 of the front of the cash-drawer and drop into the recess in which the friction-roller 17 is located. By this means the rod 15 will hold the drawer in. The inner end of each cents-key is beveled on the upper corner, as shown in Fig. 9. When it is actuated, it elevates the rod 14, which in turn elevates the rod 15 and disengages it from the friction-roller 17, allowing the drawer to be propelled outward by a spring mounted preferably in the rear. I do not show this spring, as it is such a common construction in connection with cash-drawers.

On the rear end of the shafts 3, as stated before, are mounted indicating-wheels 5 or other suitable means of carrying indicating-numerals. In order to render the mechanism simple, I rigidly mount beveled wheels, upon which I place the numerals inverted, as shown in Fig. 12, being from zero up to nine on each wheel and reflect these numerals in their upright position by a mirror 19 in the rear of the machine, as shown in Figs. 1 and 11. Over the indicating-wheels I place a cover 20, preferably black, but for convenience shown white in Fig. 2 of the drawings. I also have painted on this cover at the proper place the words "Dollars" and "Cents" and the punctuation-marks, so that they will appear in the right place in the mirror. In the cover I provide at the proper place apertures 21 large enough to reveal one numeral on each indicating-wheel and allow it to be reflected by the mirror. About the shafts 3 toward the rear end I mount a spiral spring 52 for the purpose of returning the indicating-wheels to zero when the machine is reset. To limit the movement of the shafts there are stops 49 on the casing adapted to engage the lugs 50 on the indicating-wheels. The mirror 19 is mounted in the sides of the casing and controlled by a set-screw 22, whereby the angle of such mirror may be altered. If the machine is desired to be used on the counter and to reflect the amounts registered to the rear, the object is accomplished by extending the shafts 3 farther to the rear and facing the indicating-wheels 5 and the mirror 19 about, so that it will reflect to the rear instead of to the front and reversing the order of the key-disks.

Just above the mirror on the rear of the machine I mount my chance device, whose character is as follows: I provide a chute or passage-way 23, through which a marble 24 may be thrown. One end of this chute is hinged, while the other end is made vertically movable. At the stationary end I provide means for actuating the marble, which is shown in Fig. 4. Through the end of the chute a plunger-rod 25 extends, having on its inner end a head 26. Between the head and the casing of the chute there is a spiral spring 27 to impel the plunger. To withdraw the plunger, I attach to it a lever 28, pivoted near its center to the casing of the machine with one end extending down in close proximity to a rear top corner of the cash-drawer. Extending from this part of the cash-drawer is a finger 30, having upon its upper side a cam-shaped lug 31, as shown in Figs. 4 and 5. When the cash-drawer is pushed backward, the lug 31 engages the lower end of the lever 28 and moves it to the left until the lever passes the inner end of the lug, when the lever is released and the spring 27 propels the plunger forward, whereby the marble is thrown through the chute. This construction is arranged so that the chance device is operated after the money has been put in the drawer and registered and the amount indicated by the machine. Along one face of the chute 23 are numerals—for example, from "1" to "100"—in an irregular order. The numbers may otherwise be arranged as desired.

A plan upon which the device can be operated is as follows: Give to the purchaser a certain percentage of the amount of his purchase when the marble in the chute stops opposite the last two numerals or cents-numerals of the amount of his purchase. For example, if he buys fifteen dollars and forty-six cents' worth of goods that amount is registered and indicated, as heretofore explained. If the marble stops at "46" in the chute, he is entitled to five per cent. of the amount of his purchase—that is, seventy-seven cents.

The advantage of the device is that the customer will always stop to look at that marble and compare the figure at which it stops with the amount indicated by the machine. If the latter amount is not correctly registered and indicated according to his purchase, he will call attention to the fact and have it corrected and have another chance. This seems to be the only practical method of always calling the attention of the purchaser to the amount registered and indicated. Of course the numerals and the plan or percentages may be altered, as desired, to accomplish the purpose above indicated.

The marble remains where it was in the chute until the next purchase. I provide a device whereby it may be returned to the plunger by the opening of the money-drawer when the next purchase is made, as shown in Fig. 3. Extending from the lower end of the vertically-movable end of the chute 23 is a pivoted rod or link 32, extending down to one arm of the bell-crank 33, which is centrally pivoted in the casing of the machine, the other arm being pivoted to another link 34, which is a plunger extending to the rear of the cash-drawer. The plunger is actuated by the spring 51 when the cash-drawer is withdrawn, whereby the end of the marble-chute is elevated, allowing the marble to roll to the plunger-head 26. When the cash-drawer is pushed in, it pushes the plunger 34 back, causing the chute to be returned to a horizontal position. With this device I also ring the bell 35, which is mounted in the casing and is rung by any ordinary device connected with the link 34. I have shown herein a lug 36, that actuates a pawl or clapper 37, that rings the bell, or any well-known mechanism can be used for this purpose.

It is apparent from the inspection of this machine that within the casing of a machine of ordinary size I have a large amount of space to be filled with adding-machines, if desired, or anything else. If I desire to put in only the adding device herein shown, I can reduce the depth of the machine to as small a compass as the cash-drawer will permit. The adding device which is provided consists of a counting-wheel 38, mounted loosely on each shaft, with notches running up to "20." These numerals may be placed on the periphery of the wheel, so that they can be seen when looking down upon them. I actuate the wheel by a pawl 39, pressed by the spring 40, mounted on the bracket 41, that is rigidly secured to the shaft. The wheel is prevented from turning backward by the spring-catch 42, secured to the bottom of the casing. Mounted on the bottom of the casing is a bracket supporting a casing 43, within which there is a wheel 44, provided with pins or teeth 45, adapted to be engaged at each revolution of the wheel 38 by the pin 46 and be moved one notch. Registering with the pins 45 are numerals, from zero up, which appear through an opening in the casing to indicate the number of revolutions of the wheel 38. At the end of the day's work these adding-wheels are inspected. Looking first at the cents-wheels, suppose the wheel 44 shows the figure "5," that means five revolutions of the wheel 38. Each revolution of the wheel 38 counts twenty cents. Five revolutions would be one dollar. The amounts are taken from the dimes, dollars, and tens-of-dollars wheels in the same manner, and the four amounts are added, giving the total registered. This is a very short operation, and yet the adding device is exceedingly simple. Other forms of adding devices may be used instead of those I have shown, a total-adder, if desired.

From the foregoing description of my machine it will be observed that if the operator places his thumb on the proper key he cannot possibly register more or less than the correct amount, for when the disk is rotated only that key will slip into place and operate the machine. Furthermore, only the correct amount can be indicated by the indicator, for there is no joint in the shaft or connections between the operating-disk and the wheels containing the indicating-numerals. Such rigid construction is necessarily positive and accurate in action. Hence with this machine there is no possibility of beating it. The same thing is true of the adding mechanism. The action of the shaft which drives it is positive and there is ample room for providing adding-wheels large enough to be certain and positive in their action. It will be observed also that the means of releasing the cash-drawer, whereby it flies open, is simple and positive, and likewise the means of resetting the machine, simply the movement of the rocking bar doing the work. It will be further observed that my registering and indicating machine is simple, of few parts, most of which are rigidly connected and plain in form, whereby the machine can be economically constructed, thus furnishing to merchants and those desiring cash-registers a machine for a few dollars that will do all the work of an expensive machine. In regard to the chance device I need say nothing further than what has heretofore been said, as its value in making cash-registers useful as safeguards against dishonesty is apparent at a glance. I believe it is also apparent that a device of no other character is capable of accomplishing the object so successfully.

Without limiting myself to the specific construction shown herein, what I claim, and wish to secure by Letters Patent, is the following:

1. In a cash-register, rotatable shafts mounted in the casing adapted to operate the registering mechanism, key-supporting disks secured to the end of such shafts, handles secured to the disks for rotating the same, keys mounted in the disks, stops to engage the keys when the disks are rotated and limit their movement, and means of locking the keys in place when actuated, substantially as shown and described.

2. In a cash-register, rotatable shafts adapted to actuate registering devices, key-supporting disks secured to the end of such shafts, keys mounted therein provided with a notch near their inner ends, an aperture in the casing to enable the disk to be locked in place by means of one of such keys, when pushed in, a spring for withdrawing said keys when released, a rocking plate mounted where its edge will be engaged by the operating-keys, means of rocking such plate, and stops to limit the backward movement of the shafts, substantially as shown and described.

3. In a cash register and indicator, a casing, a spring-actuated cash-drawer provided with a friction-roller, a jointed rod mounted in the casing so that one end will be vertically movable and engage the friction-roller in the cash-drawer to hold the latter in, and beveled ended registering-keys adapted when operated to engage the latch-rod and lift it out of engagement with the friction-roller in the cash-drawer.

4. In a cash register and indicating mechanism, a suitable casing, a spring-actuated cash-drawer provided with a friction-roller, a jointed latch-rod mounted in the casing and adapted to engage the friction-roller to hold the cash-drawer in, registering-keys provided with beveled ends adapted to engage and elevate such latch-rod to release the drawer, a rocking plate engaging and holding the registering-keys in place when operated, and means of rocking such plate to release the keys and latch-rod.

5. In combination with a cash register and indicator provided with a cash-drawer, a chance device for attracting the customer's attention to the amount indicated by the machine comprising a chute, a marble or other movable object therein, and means for propelling such object by operating the drawer, substantially as shown and described.

6. In combination with a cash register and indicating machine provided with a cash-drawer, a chance device mounted on the machine in close proximity to the indicator comprising a chute, a movable object therein and means for actuating such movable object by operating the cash-drawer.

7. In combination with a cash register and indicator provided with a suitable cash-drawer, a chance device comprising a chute, a movable object therein, a plunger for actuating such object, an inclined finger secured to the cash-drawer, and means whereby such finger when the cash-drawer is pushed in will actuate the plunger.

8. In combination with a cash register and indicator provided with a cash-drawer, a chance device comprising a chute, a movable object therein, means at one end of the chute for impelling such object when the cash-drawer is pushed in, and means at the other end of the chute for elevating the same when the cash-drawer is withdrawn for returning the object in the chute to the actuating means.

9. In combination with a cash register and indicator provided with a cash-drawer, a chance device comprising a chute, a movable object therein, means at one end of the chute for impelling such object when the cash-drawer is pushed in, a guideway in the casing for the vertical movement of the front end of the chute, a link-and-lever mechanism extending from the cash-drawer to the movable end of such chute for elevating such end when the cash-drawer is opened in order to return the movable object to the actuating means at the other end of the chute.

10. In combination with a cash register and indicator provided with a drawer, a chance device comprising a chute mounted in the casing hinged at one end and vertically movable in a suitable guideway at the other end, a movable object in the chute, a spring-actuated plunger at the hinged end of the chute for impelling the movable object, a finger rearwardly extending from the cash-drawer and provided with a cam-shaped lug thereon, a lever centrally pivoted connected at one end with the plunger-rod and at the other end adapted to engage the cam-shaped lug whereby the plunger will be actuated when the cash-drawer is pushed in, a bell-crank and link mechanism mounted at the other end of the chute and connected with the cash-drawer whereby such end of the chute will be elevated when the cash-drawer is opened to return the movable object in the chute, a bell mounted within the casing, and means of ringing the bell when the cash-drawer is operated.

In witness whereof I have hereunto set my hand this 18th day of October, 1894.

CHARLES H. VAN DEUSEN.

Witnesses:
J. FRANK RICHMOND,
ARTHUR S. VAN DEUSEN.